(12) United States Patent
Leibham et al.

(10) Patent No.: US 10,795,668 B2
(45) Date of Patent: Oct. 6, 2020

(54) SOFTWARE VERSION SYNCHRONIZATION FOR AVIONICS SYSTEMS

(71) Applicant: Hamilton Sundstrand Corporation, Charlotte, NC (US)

(72) Inventors: Terrence R. Leibham, St. Charles, IL (US); Michael J. Hanson, Rockford, IL (US); Dave Reiter, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 288 days.

(21) Appl. No.: 15/848,430

(22) Filed: Dec. 20, 2017

(65) Prior Publication Data

US 2019/0187978 A1 Jun. 20, 2019

(51) Int. Cl.

| | |
|---|---|
| *G06F 9/445* | (2018.01) |
| *G06F 8/71* | (2018.01) |
| *G06F 11/10* | (2006.01) |
| *B64D 47/00* | (2006.01) |
| *G06F 11/14* | (2006.01) |
| *G06F 11/16* | (2006.01) |
| *G06F 8/654* | (2018.01) |
| *G06F 8/65* | (2018.01) |

(52) U.S. Cl.
CPC ............ *G06F 8/71* (2013.01); *B64D 47/00* (2013.01); *G06F 8/65* (2013.01); *G06F 8/654* (2018.02); *G06F 9/44536* (2013.01); *G06F 11/1004* (2013.01); *G06F 11/1417* (2013.01); *G06F 11/1433* (2013.01); *G06F 11/1666* (2013.01); *B64D 2221/00* (2013.01)

(58) Field of Classification Search
CPC ..... G06F 8/65; G06F 8/67; G06F 8/68; G06F 11/1433; G06F 8/60

USPC .................................................. 717/168, 178
See application file for complete search history.

(56) References Cited

U.S. PATENT DOCUMENTS

| | | | |
|---|---|---|---|
| 6,470,224 B1 | 10/2002 | Drake et al. | |
| 6,856,045 B1 | 2/2005 | Beneditz et al. | |
| 9,327,600 B1 | 5/2016 | Nehmeh | |
| 2007/0138275 A1* | 6/2007 | Hall ...................... | G05B 19/00 235/400 |

(Continued)

OTHER PUBLICATIONS

Ecklund, R. and Liosis, A.C. (2001). Lifecycle operational flight program (OFP) loading support for the C-17 globemaster III weapon system. 2001 IEEE Autotestcon Proceedings. IEEE Systems Readiness Technology Conference. Autotestcon 2001. Valley Forge, PA. Aug. 20, 2001. pp. 962-976.

(Continued)

*Primary Examiner* — Chuck O Kendall
(74) *Attorney, Agent, or Firm* — Carlson, Gaskey & Olds, P.C.

(57) ABSTRACT

An assembly for an aircraft according to an example of the present disclosure includes, among other things, a control module including a processor and a local memory that stores a first instance of operational software executable by the processor and that relates to functionality of the control module to selectively control a vehicle system, and a backplane memory device coupled to the control module by a common backplane. The backplane memory device includes shadow memory that stores a second instance of the operational software. A method of synchronizing an assembly is also disclosed.

19 Claims, 5 Drawing Sheets

(56) References Cited

U.S. PATENT DOCUMENTS

2008/0072099 A1* 3/2008 Johansson ........... G06F 11/2097
714/1
2010/0077195 A1 3/2010 Altstaedt et al.
2013/0305238 A1 11/2013 Frayssignes et al.
2017/0101067 A1 4/2017 Carleial et al.

OTHER PUBLICATIONS

European Search Report for European Patent Application No. 18214141.6 completed Apr. 29, 2019.

* cited by examiner

SOFTWARE VERSION SYNCHRONIZATION FOR AVIONICS SYSTEMS

BACKGROUND

This disclosure relates to a synchronization of one or more components of an avionics system.

Vehicles such as aircraft typically include one or more avionics systems onboard the aircraft, such as a power distribution assembly that distributes power from a power source to the aircraft systems. The power distribution assembly may include one or more hardware modules including a control module for communication and control of power for each of the aircraft systems. One or more of the hardware modules may be removable from the power distribution assembly.

Some control modules include flash memory for storing operational software and another instance of the operational software for redundancy.

SUMMARY

An assembly for an aircraft according to an example of the present disclosure includes a control module including a processor and a local memory that stores a first instance of operational software executable by the processor and that relates to functionality of the control module to selectively control a first vehicle system, and a backplane memory device coupled to the control module by a common backplane. The backplane memory device includes shadow memory that stores a second instance of the operational software.

A power distribution system for an aircraft according to another example of the present disclosure includes at least one master power distribution assembly, and a plurality of satellite power distribution assemblies controlled by the master power distribution assembly to selectively power a plurality of aircraft systems. At least one assembly of the master and satellite power distribution assemblies includes a housing at least partially receiving a common backplane mounted to a chassis, a control module including a processor and a local memory that stores a first instance of operational software relating to functionality of the control module for selectively powering a respective aircraft system of the plurality of aircraft systems, and a backplane memory device coupled to the control module by the common backplane, the backplane memory device including shadow flash memory that stores a second instance of the operational software.

A method of synchronizing an assembly for an aircraft according to another example of the present disclosure includes storing a first instance of operational software in a local flash memory of a first line replaceable module of an assembly, the first instance relating to functionality of the first line replaceable module to selectively control an aircraft system, and loading a second instance of the operational software from a shadow flash memory of a backplane memory device into the local flash memory in response to at least one predetermined criterion being met, the backplane memory device coupled to the first line replaceable module by a common backplane.

The various features and advantages of this disclosure will become apparent to those skilled in the art from the following detailed description. The drawings that accompany the detailed description can be briefly described as follows.

BRIEF DESCRIPTION OF THE DRAWINGS

Like reference numbers and designations in the various drawings indicate like elements.

DETAILED DESCRIPTION

This disclosure is directed to synchronization of software functionality of avionics systems or assemblies to control various aircraft systems onboard the aircraft, such as power distribution assemblies that provide power to systems including vehicles such as aircraft and other aerospace systems. The power distribution assembly can include a control module that executes operational software stored in memory that includes logic or functionality to selectively power, control or otherwise interact with one or more systems or components. The assembly can include a memory device coupled to the control module by a backplane and that stores a version of the operational software, which can be loaded in the memory of the control module to replace the previously stored operational software. These and other features are described in additional detail herein.

Figure 1:
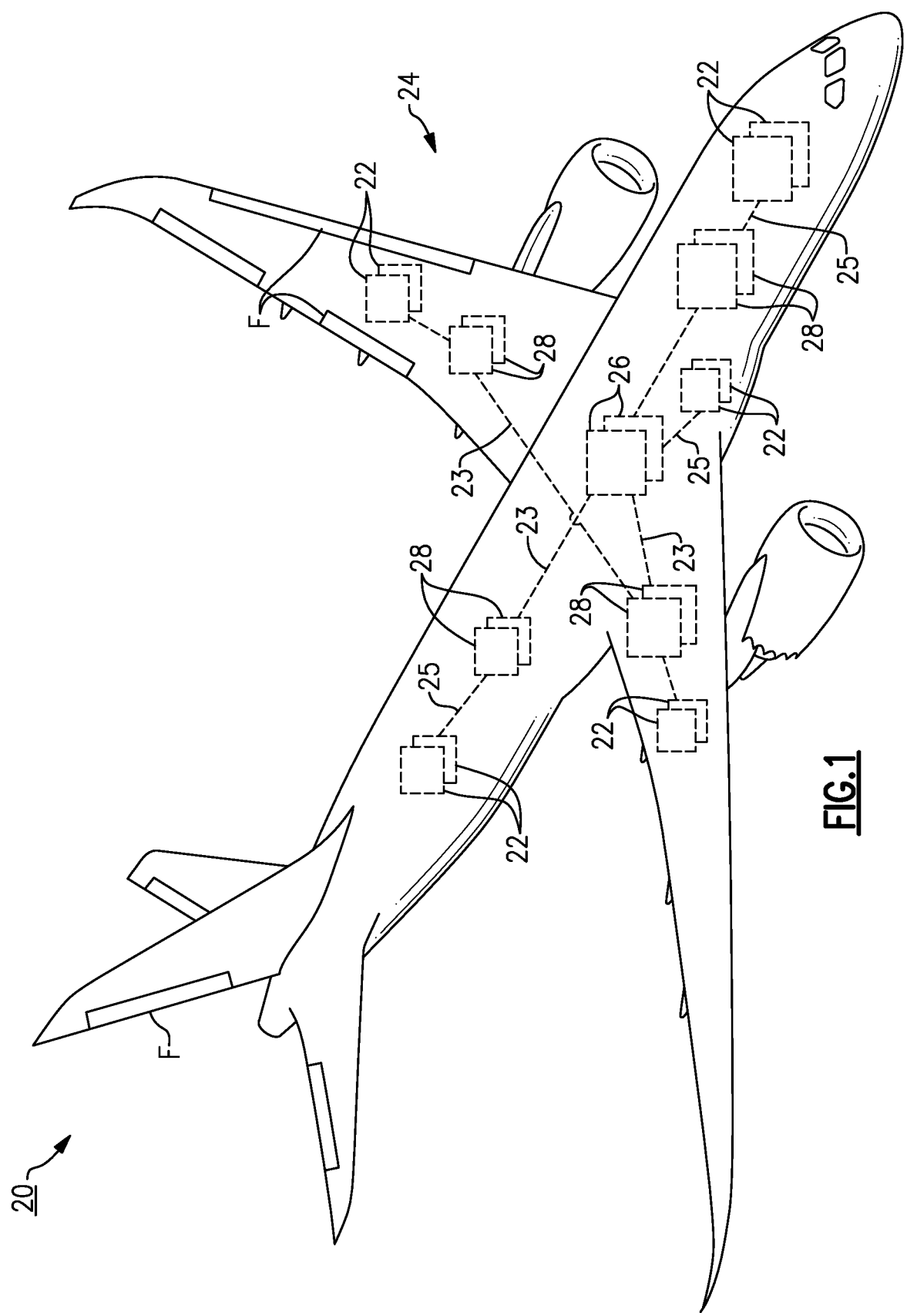
FIG. 1 illustrates an aircraft system according to an embodiment.

FIG. 1 illustrates a vehicle or aircraft 20 according to an embodiment. The aircraft 20 includes a plurality of vehicle or aircraft systems 22 distributed at various discrete locations of the aircraft 20. The aircraft systems 22 provide functionality to operate and control the aircraft 20. Example aircraft systems 22 can include avionics systems, cockpit, visualization and display systems, communications and navigation systems, and actuation systems that control or modulate one or more pumps or mechanical loads such as pivotable flaps F to maneuver the aircraft 20. Other example aircraft systems 22 can include engine and fuel systems, electrical and auxiliary power systems, environment control systems (ECS), fire protection systems, galley control systems, lighting systems, water and waste systems, landing gear systems, diagnostics systems, and other known systems, for example. Although the teachings herein primarily refer to an aircraft, other vehicle systems can benefit from the teachings herein, including other aerospace systems such as space vehicles and satellites, ground-based vehicles and power generation systems, and marine systems.

The aircraft 20 incorporates an avionics system including one or more avionics assemblies that control various other aircraft systems 22 onboard the aircraft 20. In the illustrated example of FIG. 1, the avionics system is power distribution (or avionics) system 24 operable to selectively provide power and/or control to one or more loads of the aircraft 20, including one or more of the aircraft systems 22. The power distribution system 24 includes at least one master power distribution (or avionics) assembly 26 (hereinafter "master assembly") coupled to at least one satellite power distribution (or avionics) assembly 28 (hereinafter "satellite assembly"). The master assembly 26 includes logic to control the satellite assembly 28 to selectively power, control or otherwise interact with one or more aircraft systems 22 allocated to the satellite assembly 28. Although the teachings herein primarily refer to a power distribution system having an architecture including both master and satellite power distribution assemblies, it should be appreciated that the teachings herein can be utilized for architectures having only one or more satellite power distribution assemblies. Although the teachings herein primarily refer to power distribution, other avionics assemblies can benefit from the teachings herein including assemblies that have a line replaceable microcontroller that executes operational software to control or otherwise interact with various aircraft systems onboard the aircraft, for example.

In the non-limiting embodiment of FIG. 1, the power distribution system 24 is a distributed system or architecture including a plurality of master assemblies 26 coupled to a plurality of satellite assemblies 28 via one or more communications lines 23. The satellite assemblies 28 can be remotely located from each other and/or from each master assembly 26. In some embodiments, the power distribution system 24 includes one or more assemblies 26/28 that are standalone and do not control, or are not controlled by, another assembly 26/28. The selective powering or control of each of the aircraft systems 22, or components thereof, can be allocated among the assemblies 26/28 to provide a distributed solution.

The assemblies 26, 28 are coupled to one or more aircraft systems 22 via communications lines 25 to selectively power, control or otherwise interact with one or more of the aircraft systems 22. Each communication line 23, 25 can carry one or more signals including control signals, data and/or current for selectively powering or controlling one or more components of the aircraft systems 22, for example. Each communication line discussed herein can be a single physical line or pathway or a plurality of pathways such as two or more bundled lines or cables.

Each satellite assembly 28 can be controlled by at least one of the master assembly 26 to selectively power or control the aircraft systems 22. One or more satellite assemblies 28 can control another satellite assembly 28 to selectively power or control one or more of the aircraft systems 22.

Figure 2:
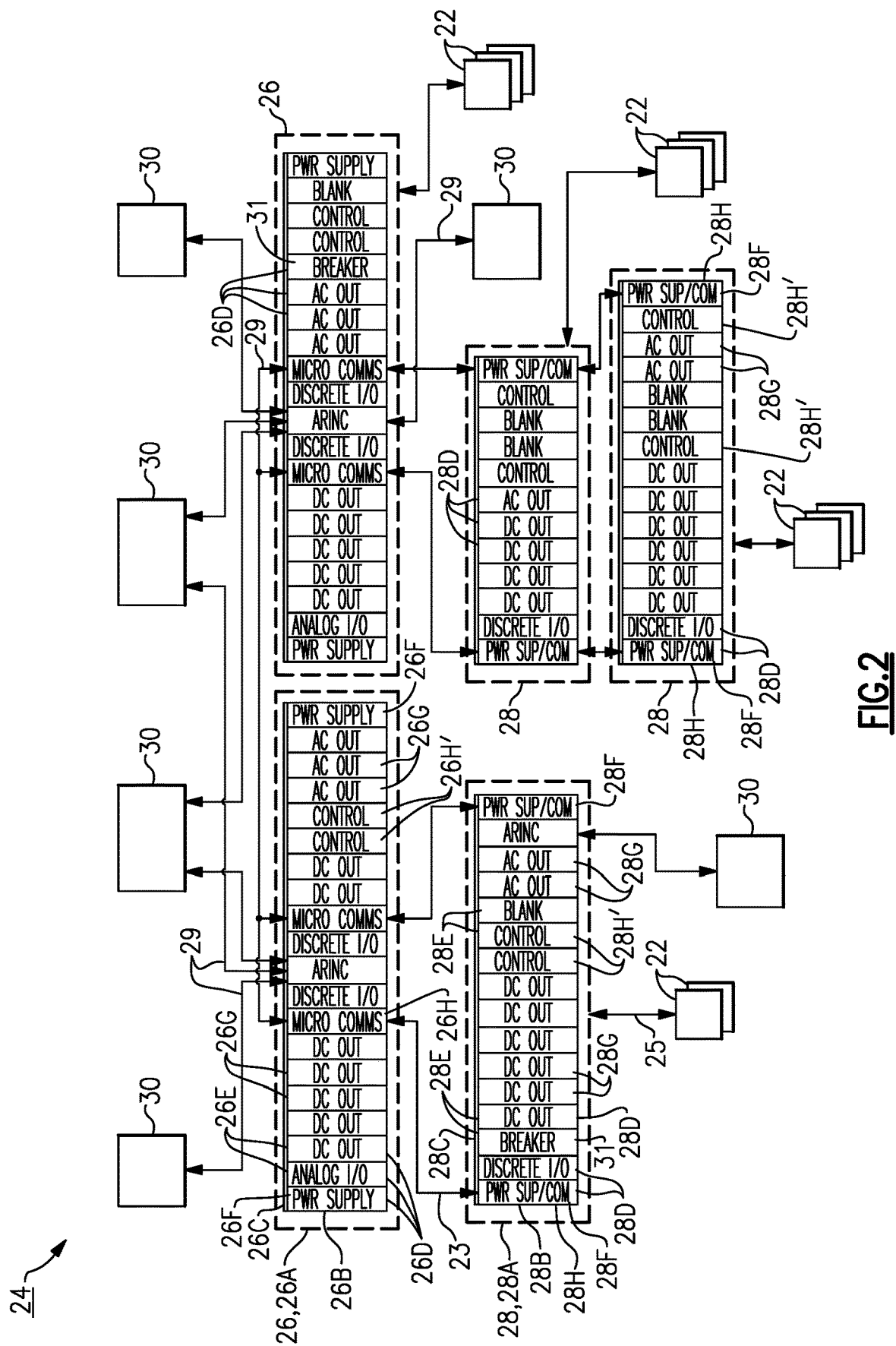
FIG. 2 illustrates a power distribution system according to an embodiment.

Referring to FIG. 2, with continued reference to FIG. 1, the power distribution system 24 is shown. For illustrative purposes, power distribution system 24 is shown in FIG. 2 including two master assemblies 26 and three satellite assemblies 28. Fewer or more than two assemblies 26 and three assemblies 28 can be utilized in accordance with the teachings herein.

Each assembly 26/28 includes a housing 26A/28A that at least partially receives a chassis 26B/28B and a common backplane 26C/28C. The backplane 26C/28C can be mounted to the chassis 26B/28B. Each hardware module 26D/28D can be at least partially received in the housing 26B/28B including a respective slot 26E/28E of the chassis 26B/28B. Some of the slots 26E/28E can be unoccupied during operation to provide a scalable solution. For the purposes of this disclosure, the term "backplane" means a group of electrical connectors or sockets in parallel with each other to form an electrical bus which additional electronic devices can be plugged into.

The common backplane 26C/28C can selectively receive and directly couple together a plurality of the hardware modules 26D/28D to establish connectivity for communicating data and other electrical signals such as a current supply during operation. Example hardware modules 26D/28D can include one or more power supplies 26F/28F that receive incoming power that is distributed to one or more output modules 26G/28G to selectively power or control the respective aircraft system(s) 22. The output modules 26G/28G are operable to selectively provide DC and/or AC current to one or more aircraft systems 22. Other example hardware modules 26D/28D can include one or more input/output modules and communication modules, including Aeronautical Radio, Inc. (ARINC)-compliant modules, for communicating or otherwise receiving and sending signals to various components including other assemblies 26, 28 and the aircraft systems 22.

Each assembly 26/28 can include one or more (or only one) communications or control modules 26H/28H that interconnect and are operable to route data and other information between the hardware module(s) 26D/28D and other assemblies 26, 28. The control modules 26H/28H can include logic to control and/or be controlled by other assemblies 26/28 and to control other hardware modules 26D/28D to selectively power or control the aircraft systems 22. In embodiments, the assembly 26/28 can include one or more separate control modules 26H'/28H' to provide the control function. In some embodiments, the control module(s) 26H of the master assembly 26 provide command and communications functionality to control the system 24, whereas the module(s) 28H of the satellite assembly 28 provides communications routing but not command functionality to control the system 24. Each assembly 26, 28 can be coupled to one or more control systems 30 via one or more communications lines 29. The control systems 30 can be arranged at various locations of the aircraft 20 and include an interface and logic to control the aircraft systems 22, including causing the power distribution system 24 to selective power one or more of the aircraft systems 22 during operation of the aircraft 20. For example, the control systems 30 can include avionics computers and multifunction control display units, galley control panels engageable by interaction from aircraft operators, crew and other users of the aircraft 20.

Figure 3:
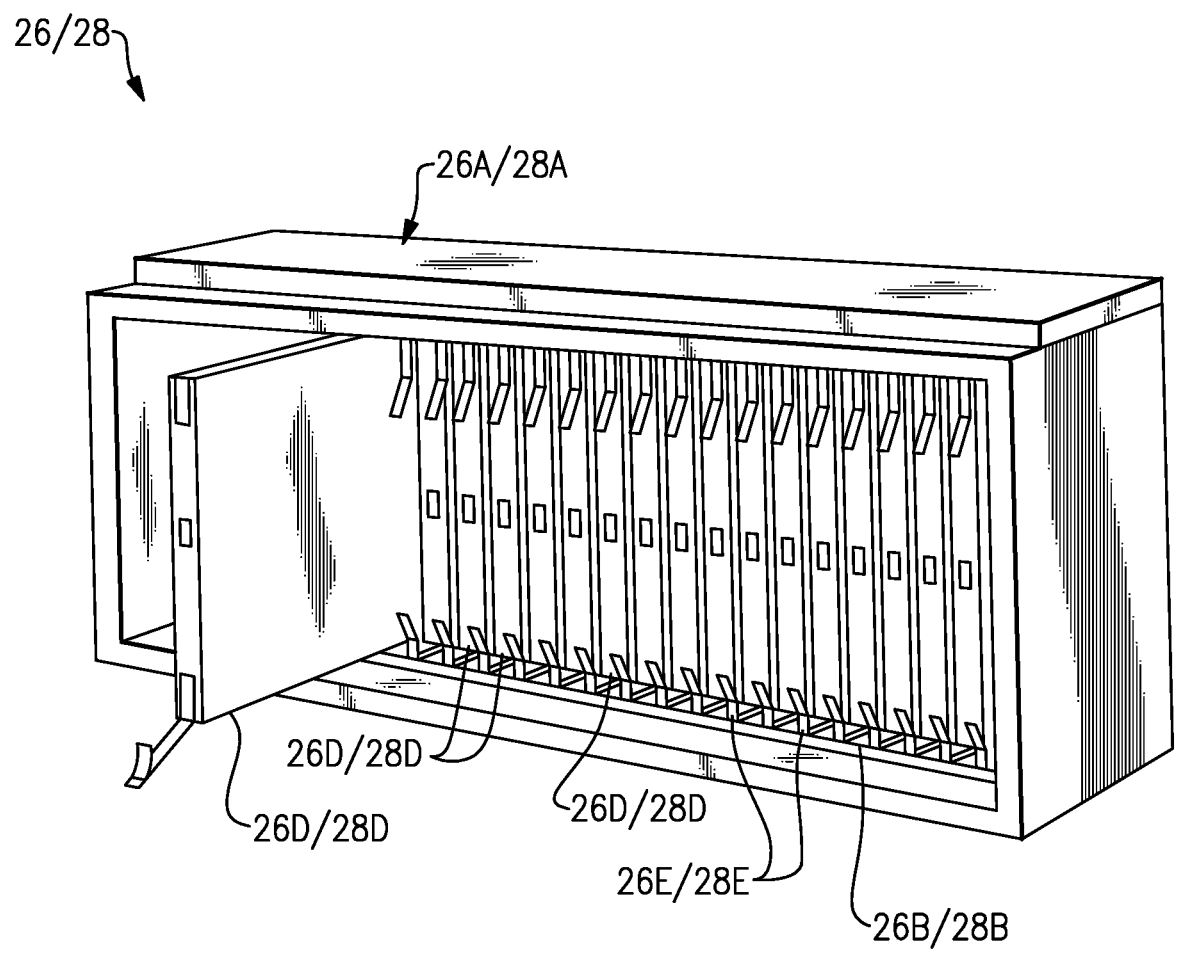
FIG. 3 illustrates a perspective view of a power distribution assembly according to an embodiment.

FIG. 3 illustrates a perspective view of an example assembly 26/28. As shown, the assembly 26/28 includes hardware modules 26D/28D that are selectively installed or otherwise at least partially received within chassis 26B/28B. Each of the hardware modules 26D/28D can be configured as a line replaceable module (LRM) selectively installed in and removed from one of the slots 26E/28E. Each LRM provides a discrete functionality in a removable hardware device. For the purposes of this disclosure, a line replaceable module (LRM) is a modular component that is designed to be replaced at an operating location of the unit or system incorporating the component, and typically requires few or no tooling to conduct the replacement. Example LRMs can include single board computers or other circuit cards including a connector received in a socket coupled to common backplane 26C/28C (FIG. 2). Each assembly 26/28 can be configured as a line replaceable unit (LRU) comprising one or more LRUs. It should be appreciated, however, that the teachings herein are not limited to an LRU/LRM-based architecture.

Figure 4:
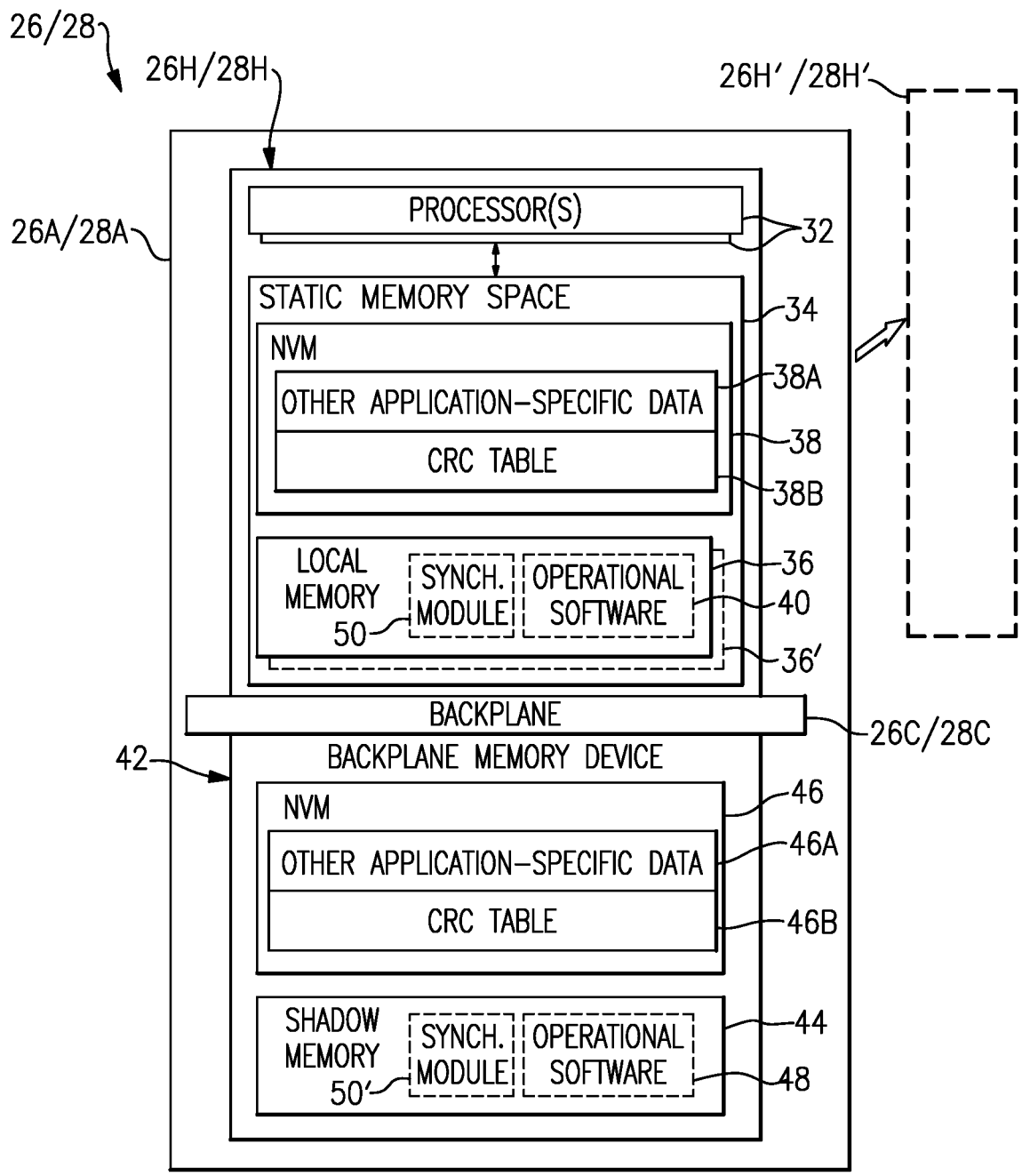
FIG. 4 illustrates portions of the power distribution assembly of FIG. 3.

Referring to FIG. 4, with continued reference to FIGS. 2 and 3, an exemplary control module 26H/28H is shown. Each control module 26H/28H includes memory, an interface and at least one (or only one) processor 32 that can execute one or more instructions including accessing a static memory space 34 to read and/or write various data. The processor 32 may, for example only, be any type of known microprocessor (µP) having desired performance characteristics.

The static memory space 34 includes a local memory 36 and a non-volatile memory (NVM) 38. The local memory 36 can be a solid-state storage device such as flash memory, for example, or another device that persistently stores data. The local memory 36 is operable to store a first instance 40 of operational software that is executable by the processor 32 and that corresponds or otherwise relates to discrete, predefined functionality of the control module 26H/28H to communicate with other assemblies 26/28 and to selectively power, control or otherwise interact with one or more of the aircraft systems 22 (FIG. 2).

The operational software can include a discrete set of commands or functions that can be compiled into executable code that can be executed by the processor 32 from the local memory 36, which can include loading one or more instructions of the operational software into read-only memory (ROM) or another memory space, for example. In embodiments, the operational software includes an operating system (OS) including one or more software utilities and applications to provide the desired functionality. The operational software can be stored as an image into memory, for example.

The operational software includes logic that controls specific functionality of the respective aircraft system(s) 22. For example, the operational software can include one or more utilities or functionality for controlling the hardware modules 26D/28D to selectively power, control or otherwise interact with one or more devices, and communicating with other assemblies 26/28. Example functionality can include actuating a pump to modulate flow of fuel to an engine, actuating a switch to activate lighting, and providing power to a radio or another communications system in response to system initialization. Other example functionality can include powering a de-icing heater, providing power to a galley, and communications with other consoles such as a control display unit (CDU). The operational software of the respective assembly 26/28 can differ from the operational software of one or more other assemblies 26/28, with the operational software of the assembly 26/28 providing a discrete portion of the aggregate functionality of the power distribution system 24. One would understand how to program the operational software to achieve the desired functionality for selectively powering, controlling or otherwise interacting with the respective aircraft system(s) 22 of the aircraft 20 utilizing the teachings disclosed herein.

NVM 38 can include one or more discrete memory spaces. In the illustrated example of FIG. 4, NVM 38 includes at least two memory spaces 38A-38B, although fewer or more than two memory spaces can be utilized. Memory space 38A can include a space that stores other application-specific data such as boot and board support package startup fault codes and other board information, and state information of the operational software and/or hardware modules 26D/28D of the assembly 26/28, for example. Memory space 38B can include a cyclic redundancy check (CRC) table for sectors of the local memory 36, for example.

The control module 26H/28H is coupled to a backplane memory device 42 by the common backplane 26C/28C. The backplane memory device 42 can be selectively inserted into or installed in the common backplane 26C/28C and can be at least partially received in the housing 26A/28A.

The backplane memory device 42 includes at least a shadow memory 44 and a non-volatile memory (NVM) 46 accessible by the control module 26H/28H via the common backplane 26C/28C. The shadow memory 44 can be a solid-state storage device such as flash memory, or another device that persistently stores data. The shadow memory 44 stores a second instance 48 of the operational software that corresponds or otherwise relates to the discrete, predefined functionality of the control module 26H/28H, which can be the same or differ from the first instance 40 of the operational software.

NVM 46 can include one or more discrete memory spaces. In the illustrated example of FIG. 4, NVM 46 includes two memory spaces 46A-46B, although fewer or more than two memory spaces can be utilized. Memory space 46A can store other application-specific data relating to the operational software and/or hardware modules 26D/28D (FIG. 2), such as one or more parameters or configuration files relating to the applications, system architecture and/or respective aircraft systems 22, for example. Memory space 46B can include a cyclic redundancy check (CRC) table for sectors of the shadow memory 44, for example.

In embodiments, the control module 26H/28H is a first LRM that can replace a second, different LRM 26H'/28H' (shown in dashed lines) previously installed in the respective assembly 26/28. Replacement can occur, for example, due to hardware failure or obsolescence of the particular version of circuitry of the control module 26H/28H. The first instance 40 of the operational software that is stored in the local memory 36 may correspond to a different, earlier and/or incorrect version of the operational software than desired. An incorrect version can include a later version of the operational software than compatible with the system or than desired, for example. Thus, it may be desirable to load a correct or different version of the operational software into the local memory 36 to be executed by the processor 32 during operation of the assembly 26/28. In embodiments, the assembly 26/28 includes only a single control module 26H/28H such that the operational software of the assembly 26/28 cannot be compared to the operational software of another control module that would otherwise reside in the same assembly 26/28 to determine whether a different version of the operational software should be loaded.

The control module 26H/28H is programmed with logic to load or install the second instance 48 of the operational software from the shadow memory 44. The second instance 48 can correspond to the respective hardware version of the control module 26H/28H, for example. In the illustrated embodiment of FIG. 4, the local memory 36 includes a synchronization module 50 including one or more instructions that can be executed by the processor 32 for synchronizing and validating a version of the operational software stored in the local memory 36 with the version of operational software stored in the shadow memory 44, including synchronizing the operational software with the respective hardware configuration or version of the control module 26H/28H. In another embodiment, the static memory space 34 includes the local memory 36 that stores the operational software 40 and another local memory 36' (shown in dashed lines) that stores the synchronization module 50. In other embodiments, synchronization module 50' is stored in the shadow memory 44.

The synchronization module 50 includes logic for accessing the memory space of the first second instance of the operational software 48 in the backplane memory device 42 and to compare the first and second instances 40, 48 of the operational software. The synchronization module 50 is programmed with logic that causes the processor 32 to replace the first instance 40 in the local memory 36 with a local copy of the second instance 48 in response to at least one, or more than one, predetermined criterion being met. In embodiments, the predetermined criterion is met in response to the first instance 40 being a first version of the operational software and the second instance 48 being a second, different version of the operational software. For example, the predetermined criterion can be met in response to the first version being an earlier version of the operational software than the second version.

Other predetermined criterion can include validating the integrity of the operational software stored in the local memory 38 and/or shadow memory 44. In embodiments, the synchronization module 50 is programmed with logic to evaluate or compare the CRC table stored in memory space 38B and/or 46B to determine whether or not the first and/or second instance 40, 48 of the operational software is corrupted. In embodiments, the predetermined criterion is met in response to the synchronization module 50 determining that the first instance 40 of the operational software is corrupted, but is not met in response to the synchronization module 50 determining that the second instance 48 of the operational software is corrupted. This technique can reduce operational downtime that may be otherwise caused by loading a corrupted version of the operational software into the local memory 36.

The synchronization module 50 can be executed during each startup or initialization of the control module 26H/28H or at another desired state of the system to determine whether the first instance 40 should be replaced with the second instance 48 of operational software. In embodiments, the synchronization module 50 is programmed with logic to compare the CRC tables stored in memory spaces 38B, 46B to determine whether the respective versions of the operational software are the same or match, with the predetermined criterion being met when the versions differ from each other. The techniques disclosed herein can reduce the installation time and hardware/software tooling required to install or load the desired version of operational software in the local memory 36 for execution by the processor 32 during operation of the power distribution system 24.

Figure 5:
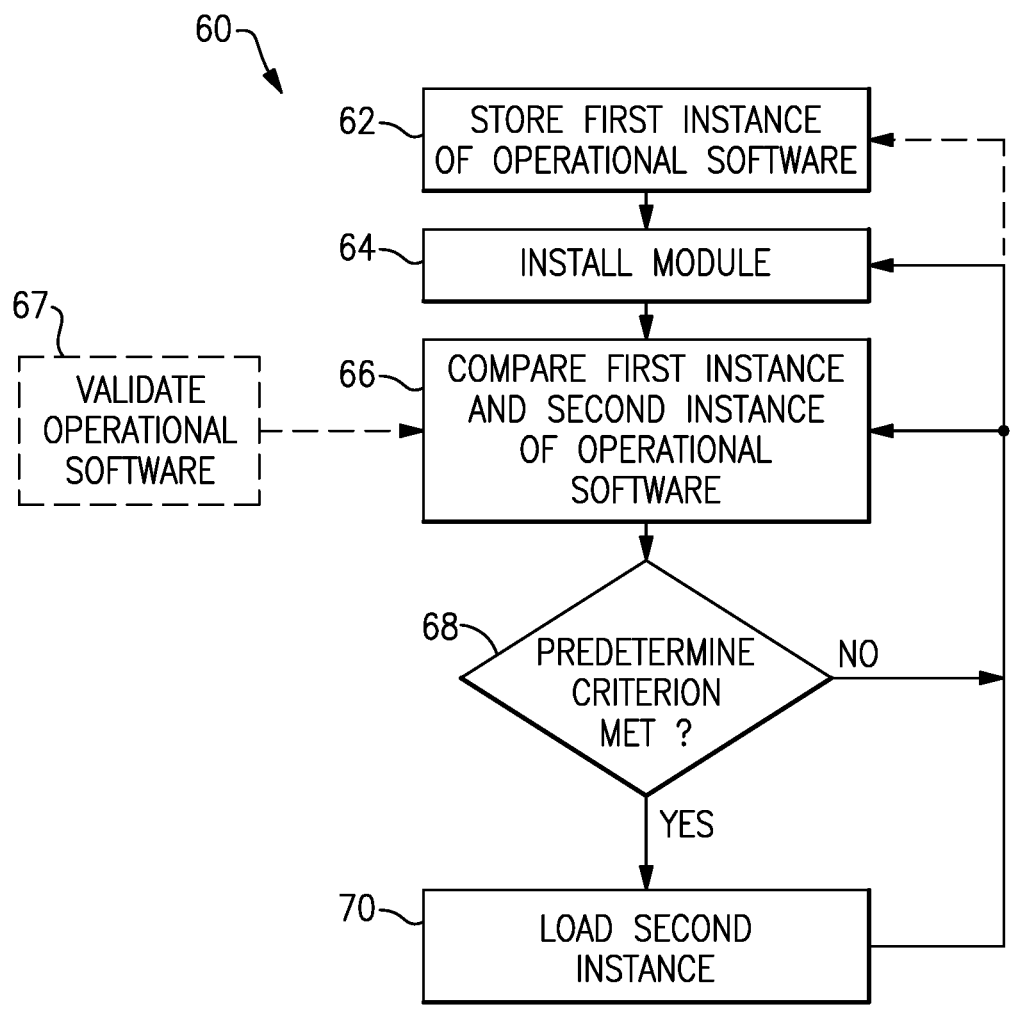
FIG. 5 illustrates a process for synchronizing a power distribution assembly according to an embodiment.

FIG. 5 illustrates an example algorithm in a flowchart 60 for synchronizing versions of operational software of an avionics assembly such as a power distribution assembly. The algorithm can be utilized with any of the assemblies 26/28, hardware modules 26D/28D and/or control modules 26H/28H disclosed herein, including the synchronization module 50. At block 62, a first instance of operational software is stored in a local memory such as a local flash memory of a first control module or LRM of a power distribution assembly (e.g., local memory 36 of FIG. 4). The first instance relates to the functionality of the first control module or LRM to selectively power, control or otherwise interact with a vehicle or aircraft system. Block 62 can include storing a second instance of the operational software in a shadow flash memory of a backplane memory device (e.g., the backplane memory device 42 of FIG. 4). Block 62 may occur, for example, when the assembly 26/28 is fabricated and configured prior to installation on the aircraft 20, with the first instance and the second instance of the operational software being the same version. In embodiments, at block 64 a second control module or LRM is replaced with the first control module or LRM such that the first control module or LRM is installed in the respective power distribution assembly. Installation of the second control module at block 64 may occur, for example, due to degradation or obsolescence of the first control module.

At block 66, the first instance of the operational software and a second instance of the operational software are compared, which can occur during each startup of the control module or LRM, for example. In embodiments, the comparison includes validating the operational software by determining whether or not the operational software is corrupted or differs from a predetermined state at block 67.

At block 68, the algorithm determines whether or not one or more predetermined criterion is met, including any of the predetermined criteria disclosed herein such as a version or integrity of the operational software stored in the local memory differing from the operational software stored in the shadow memory. In an embodiment, the predetermined criterion includes installing the first control module or LRM in the respective power distribution assembly, such as during initial construction and assembly of the power distribution assembly. In embodiments, the predetermined criterion includes replacing a second control module or LRM with the first control module or LRM, which can occur at block 64, for example. The algorithm can be repeated by returning to one of the blocks 62, 64, 66 in response to the predetermined criterion not being met.

At block 70, the second instance of the operational software is installed or loaded from the shadow memory into the local memory of the control module or LRM in response to the at least one predetermined criterion being met. In embodiments, block 70 includes replacing the first instance with a local copy of the second instance. Thereafter, the system can be rebooted to execute the second instance of the operational software. The algorithm can be repeated by returning to one of the blocks 62, 64, 66.

The techniques disclosed herein, including storing the operational software on the backplane memory device 42 accessible from the common backplane 26C/28C, can reduce maintenance downtime due to replacement of the control module 26H/28H and potentially avoids a need to download and store the correct version of the operational software by a maintenance operator which may otherwise occur in the field or at a customer location. The correct or desired operational software can also be autonomously loaded from the backplane memory device 42 to improve system performance and efficiency such as by executing a more recent or enhanced version of the operational software to provide the desired solution, and can also maintain or otherwise improve configuration control between the software and hardware of the assembly 26/28.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An assembly for an aircraft comprising:
   a control module including a processor and a local memory that stores a first instance of operational software executable by the processor and that relates to functionality of the control module to selectively control a vehicle system;

a backplane memory device coupled to the control module by a common backplane, the backplane memory device including shadow memory that stores a second instance of the operational software; and a housing and a plurality of line replaceable modules including the control module, the housing at least partially receiving the common backplane and the plurality of line replaceable modules coupled to the common backplane; and wherein the control module includes a synchronization module that accesses the memory space of the second instance of the operational software in the backplane memory device, compares the first instance and the second instance, and replaces the first instance with a local copy of the second instance in response to at least one predetermined criterion being met.

2. The assembly as recited in claim 1, wherein the shadow memory is flash memory.

3. The assembly as recited in claim 2, wherein the backplane memory device includes non-volatile memory that stores application-specific data relating to the second instance of the operational software.

4. The assembly as recited in claim 1, wherein the first instance is a first version of the operational software, and the second instance is a second, different version of the operational software.

5. The assembly as recited in claim 4, wherein the at least one predetermined criterion is met in response to the first version being an earlier or incorrect version of the operational software than the second version.

6. The assembly as recited in claim 5, wherein the backplane memory device includes non-volatile memory that stores a cyclic redundancy check (CRC) table relating to the operational software.

7. The assembly as recited in claim 1, wherein the local memory is flash memory, and the control module includes non-volatile memory that stores a cyclic redundancy check (CRC) table relating to the operational software.

8. A power distribution system for an aircraft comprising:
at least one master power distribution assembly;
a plurality of satellite power distribution assemblies controlled by the master power distribution assembly to selectively power a plurality of aircraft systems; and
at least one assembly of the master and satellite power distribution assemblies comprising:
a housing at least partially receiving a common backplane mounted to a chassis;
a control module including a processor and a local memory that stores a first instance of operational software relating to functionality of the control module for selectively powering a respective aircraft system of the plurality of aircraft systems; and
a backplane memory device coupled to the control module by the common backplane, the backplane memory device including shadow flash memory that stores a second instance of the operational software; and
wherein the control module includes a synchronization module that causes the processor to replace the first instance with a local copy of the second instance in response to at least one predetermined criterion being met.

9. The power distribution system as recited in claim 8, wherein the local memory is flash memory.

10. The power distribution system as recited in claim 9, wherein the control module is a first line replaceable module, and the at least one predetermined criterion relates to replacement of a second control module in the at least one assembly of the satellite power distribution assemblies with the first line replaceable module.

11. The power distribution system as recited in claim 9, wherein each satellite power distribution assembly of the plurality of satellite power distribution assemblies are remotely located from each other and from the at least one master power distribution assembly.

12. A method of synchronizing an assembly for an aircraft comprising:
storing a first instance of operational software in a local flash memory of a first line replaceable module of an assembly, the first instance relating to functionality of the first line replaceable module to selectively control an aircraft system; and
loading a second instance of the operational software from a shadow flash memory of a backplane memory device into the local flash memory in response to at least one predetermined criterion being met, the backplane memory device coupled to the first line replaceable module by a common backplane; and
wherein the step of loading includes replacing the first instance with a local copy of the second instance in response to the at least one predetermined criterion being met.

13. The method as recited in claim 12, wherein the assembly is a power distribution assembly coupled to at least one other power distribution assembly to selectively power to a plurality of aircraft systems including the aircraft system.

14. The method as recited in claim 12, wherein the at least one predetermined criterion includes installing the first line replaceable module in a housing of the assembly.

15. The method as recited in claim 14, wherein the at least one predetermined criterion includes replacing a second line replaceable module with the first line replaceable module.

16. The method as recited in claim 15, comprising comparing the first instance and the second instance during startup of the first line replaceable module, and the least one predetermined criterion being met in response to the first instance differing from the second instance.

17. The assembly as recited in claim 5, wherein the control module is a first line replaceable module of the plurality of line replaceable modules, and the at least one predetermined criterion includes a first predetermined criterion that relates to replacement of a second control module of the plurality of line replaceable modules with the first line replaceable module.

18. The assembly as recited in claim 17, wherein the at least one predetermined criterion includes a second predetermined criterion that is met in response to the first version being an earlier version of the operational software than the second version.

19. The method as recited in claim 15, wherein the second line replaceable module is a control module operable to selectively control the aircraft system.

* * * * *